March 8, 1949.   E. C. HEFELFINGER   2,463,967
CYLINDER CARRIAGE
Filed Nov. 13, 1944
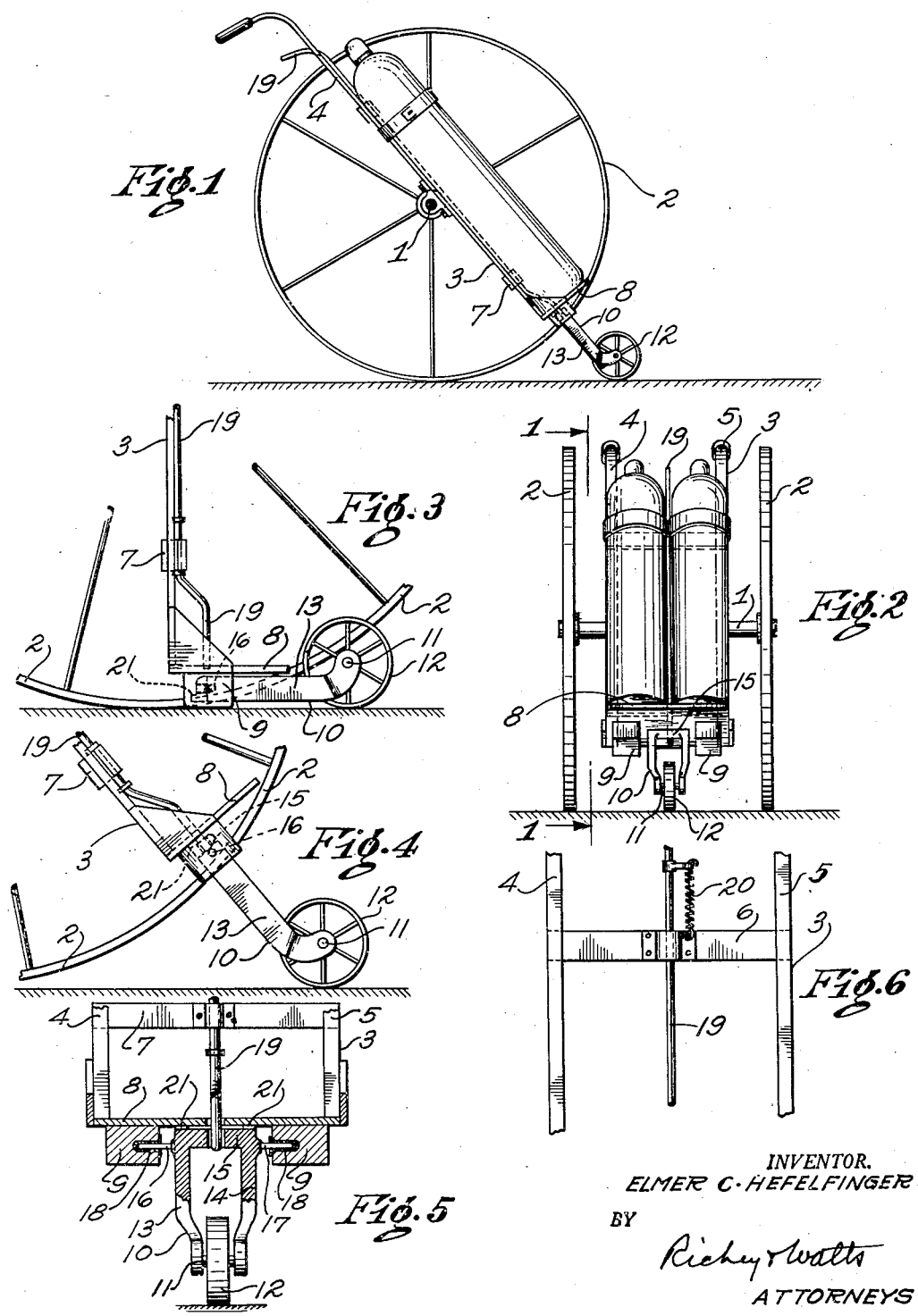
INVENTOR.
ELMER C. HEFELFINGER
BY
Richey & Watts
ATTORNEYS Patented Mar. 8, 1949

2,463,967

UNITED STATES PATENT OFFICE 2,463,967

CYLINDER CARRIAGE

Elmer C. Hefelfinger, Painesville, Ohio, assignor to Diamond Alkali Company, Cleveland, Ohio, a corporation of Delaware Application November 13, 1944, Serial No. 563,270

6 Claims. (Cl. 280—54)

The present invention relates generally to transportation means and more particularly to a new and improved carrier for gas welding apparatus and the like.

Welding equipment carriages at present generally employed are customarily loaded with heavy, bulky objects, such as compressed gas cylinders, by bodily lifting them onto the carriage and, in consequence, their use results in many personnel accidents and injuries. My new device can be loaded and unloaded with such objects without any such lifting by the operator and therefore, is safer and more economical than the prior carriages.

In the drawings accompanying and forming a part of this specification,

Figure 1 is a section taken along line 1—1 of Figure 2 showing one form of carriage of my invention upon which are mounted two gas cylinders of the type usually carried by such carriages, Figure 2 is a front elevation view of the loaded carriage of Figure 1, Figure 3 is a side elevation on an enlarged scale of the small wheel assembly of the carriage of Figures 1 and 2 with the load carrying frame in upright position, parts being broken away, Figure 4 shows the small wheel as a support member but otherwise is the same as Figure 3, Figure 5 is an enlarged front view partly in section of aforesaid small wheel assembly with the small wheel again a support member, and Figure 6 is an enlarged front view of the upper mid-section of the carriage showing the spring attachment.

The carriage comprises an axle 1, two large wheels 2, and a frame 3 attached to axle 1 and rotatable thereabout. The frame 3 consists of parallel load supporting bars 4 and 5 rigidly joined near their upper and lower ends by the spacers 6 and 7, respectively, and by a forwardly projecting ledge or flange 8 at their extreme lower ends. This ledge 8 preferably extends forwardly of the frame for a distance which is substantially the diameter of an average size gas cylinder, i. e. about 8 inches. The bars, spacers and ledge are attached to each other in any suitable manner, as by welding. The frame is equipped with the conventional cylinder-securing means as shown in the drawings.

To the bottom of the ledge member 8 is secured, as by welds, the small auxiliary wheel assembly better illustrated in Figure 3 and comprising blocks 9, yoke 10, axle 11, and wheel 12. Blocks 9, the only elements of the said wheel assembly connected with ledge member 8 and immovable with respect thereto, are so dimensioned that the carriage frame, when in vertical or upright position, is supported by large wheels 2 and these blocks. Yoke 10, J-shaped in side elevation (see Figure 4), includes top 15 and legs 13 and 14, which latter form the bottom curve of the J and mount wheel 12 on axle 11, which is journaled therebetween. The yoke 10 is mounted for rotation about the axis of which pins 16 and 17, mounted in the upper portion of legs 13 and 14, form the center, the pins 16 and 17 being journaled for rotation in recesses 18 in blocks 9.

In Figures 1, 2, 4, and 5 wheel 12 is shown as one of three points of support of the carriage when frame 3 is inclined at an angle to the vertical. In the rest position of the carriage shown in Figure 3, blocks 9 contribute to the support of the carriage, which is this position is substantially upright. Bar 19 is slidably secured in any desired manner to spacers 6 and 7 and ledge 8 about midway between bars 4 and 5 and is urged in a downward direction by spring 20, which may conveniently be secured to spacer 6 as shown. When bar 19 is inserted into the aperture in top 15, as shown in Figures 1, 2, 4, and 5, the yoke 10 is rigidly held in substantially the plane assumed by frame 3 and wheel 12 constitutes a leading wheel and auxiliary support for the carriage.

Bar 19 ought to be especially strong and tough and resistant to bending or breaking in the vicinity of its lower extremity which is engageable with the aperture in top 15. There the weight of the carriage and its burden is supported and while ordinarily not great in static condition, that force becomes excessive during brief periods when the carriage is tilted backward and permitted to fall or is pushed forward onto the small wheel. In general use care would not be conveniently exercised to ease the carriage toward upright position placing the load on the small wheel. Therefore, in order to prevent bending or breaking of bar 19 in general use, I fabricated it by welding together two bars. The short segment, which is about 4 inches long may be of high carbon (0.90%) steel and constitutes the lower extremity of bar 19; it may be welded to an end of the other segment of medium or low carbon content.

Bar 19 is capable of movement through a space of several inches and is disengageable from the aperture in top 15 by drawing said bar upward against the tension of spring 20. Lugs 21 secured to the upper surface of top 15 prevent rearward motion of the yoke 10 about the pins 16 and 17 as a center past the point at which the yoke lies substantially in the same plane as the frame 3.

Accordingly, to secure wheel 12 in auxiliary load bearing relation, bar 19 may be drawn upwardly tensioning spring 20, frame 3 may be moved toward the horizontal until wheel 12 is off the floor and yoke 10 being prevented from rotation on pins 16 and 17 by lugs 21, the spring 20 may then force bar 19 into registry with the aperture in yoke top 15.

Using the vehicle of my invention to transport gas cylinders and starting with it in the position shown in Figure 1, in order to load or unload, bar 19 is first drawn upwards with respect to the load carrying frame and disengaged from the small wheel assembly, then the frame is tilted forward, i. e., into substantially vertical position. The length of the frame from the axle 1 to the under surfaces of blocks 9 being substantially equal to the radius of wheels 2, said frame rests substantially upright on blocks 9, and on wheels 2. As ledge 8, under such circumstances, may be only about 2 inches from the floor, a gas cylinder may be placed on the carriage by first tilting it away from the vehicle, placing the edge of said carriage under that portion of the cylinder under-surface above said ledge and then moving the side wall of the cylinder into contact with the vehicle's load carrying frame. Said frame is then tilted from the upright position until yoke 10 is supported from rotation by lugs 21 and, in the manner above described, bar 19 is forced into the aperture in top 15 and the frame is permitted to move toward the vertical position until the small wheel contacts a supporting surface. At this time, or, if desired, when the cylinder is first placed on the frame, the cylinder is attached to the frame by aforementioned securing means.

In unloading my carriage the load carrying frame is tilted until the small wheel is lifted from the floor, then bar 19 is drawn from engagement with the aperture in top 15 and the frame is permitted to move into substantially upright position. As this movement progresses, the small wheel assembly, which was in position substantially in the plane of frame 3 pivots about the axis centered in recesses 18 until it is substantially parallel to the ledge with the small wheel forward of the free end of said ledge. At that time, members 9 engage the floor, as illustrated in Figure 3, and serve to brake motion of the carriage on wheels 2 or on axle 1. The cylinder is then eased off ledge 8 and set upon the floor without substantially lifting effort.

Having thus described my invention so that others skilled in the art may be able to understand and practice the same, I state that what I desire to secure by Letters Patents is defined in what is claimed.

What is claimed is:

1. A carrier of the class described comprising an axle and two wheels rotatably mounted thereon, a frame secured to the axle and having a portion to engage the side of a container and a ledge to engage the bottom of a container, the distance of said ledge from the centerline of said axle being substantially equal to the radius of either of said two wheels, a member movably carried by the frame, an assembly pivoted beneath the ledge and comprising a wheel of relatively small diameter as compared with the diameter of the said two wheels and a piece having a recess into which said movably carried member can be inserted to lock said small wheel in predetermined position and prevent pivotal movement of the small wheel while not permitting rotational movement of said small wheel.

2. A carrier of the class described comprising an axle and two wheels rotatably mounted thereon, a frame secured to the axle and having a portion to engage the side of a container and a ledge to engage the bottom of a container, the distance of said ledge from the centerline of said axle being substantially equal to the radius of either of said two wheels, a member movably carried by the frame, an assembly pivoted beneath the ledge and comprising a wheel of relatively small diameter as compared with the diameter of the said two wheels and a piece engageable with the member movably carried by the frame to lock the small wheel in predetermined position and prevent pivotal movement of the small wheel while not permitting rotational movement of said small wheel, and a spring attached to said frame and said movably carried member in such manner as to hinder movement of said member relative to said frame and away from said piece of the wheel assembly.

3. A carrier of the class described comprising an axle and two wheels rotatably mounted thereon, a frame secured to the axle and having a portion to engage the side of a container and a ledge to engage the bottom of a container, the distance of said ledge from the centerline of said axle being substantially equal to the radius of either of said two wheels, a member movably carried by the frame, an assembly pivoted beneath the ledge and comprising a wheel of relatively small diameter as compared with the diameter of the said two wheels, a piece attached to the movable portion of the small wheel assembly having a recess into which the member movably carried by said frame can be inserted to lock the small wheel in predetermined position and prevent pivotal movement of the small wheel while permitting rotational movement of said small wheel, and another piece attached to the movable portion of the small wheel assembly and of such dimension and disposition that aforesaid movably carried member and the recess in aforesaid piece are in register when this latter piece contacts the ledge, and a spring attached to the frame and said movably carried member in such manner as to hinder movement of said member relative to said frame and away from aforesaid piece attached to the small wheel assembly.

4. A carrier of the class described comprising an axle and two wheels rotatably mounted thereon, a frame secured to the axle and having a portion to engage the side of a container and a ledge to engage the bottom of a container, the distance of said ledge from the centerline of said axle being substantially equal to the radius of either of said two wheels, an assembly comprising a wheel small by comparison with aforesaid two wheels which assembly is pivoted for movement beneath the ledge from a position perpendicular to the ledge to a position substantially parallel thereto and with the small wheel forward of the free edge of the ledge, and means to lock said assembly in predetermined position.

5. A carrier including an axle mounting main load bearing wheels, a load supporting frame rotatably mounted on said axle, an auxiliary load supporting wheel secured to said frame and mounted for rotation on an axle disposed in parallel relation to said first axle, said auxiliary wheel being mounted to maintain said frame in stable angular relation to the horizontal when said carrier is in normal load supporting position, in order for said main load bearing wheels to proceed in normal course of travel, said auxiliary wheel being disengageable from load supporting relation to permit rotation of said frame about said first axle to substantially vertical loading and unloading position, and auxiliary non-rotatable floor engaging means to assist in support of said carrier when said frame is in substantially vertical position, said means being secured to said frame and mounted to be positively placed in floor engagement upon disengagement of said auxiliary wheel and when so positively placed to brake the rotational movement of said main load bearing wheels.

6. A carrier including an axle mounting main load bearing wheels, a load supporting frame rotatably mounted upon said axle at a point substantially spaced from the upper and lower extremities of said frame, an auxiliary load supporting wheel secured to said frame below said axle and mounted to bear a portion of the load on said axle when said carrier is in normal load bearing position, said auxiliary wheel being disengageable from positive load supporting relation to permit said frame to come to substantially vertical loading and unloading rest position and blocks mounting said auxiliary wheel and disposed to become floor engaging and form auxiliary load support when said auxiliary wheel is disengaged.

ELMER C. HEFELFINGER.

REFERENCES CITED

The following references are of record in the file of this patent:

UNITED STATES PATENTS

| Number | Name | Date |
|---|---|---|
| 672,152 | Ruher | Apr. 16, 1901 |
| 680,251 | Hill | Aug. 13, 1901 |
| 710,845 | Cummins | Oct. 7, 1902 |
| 780,653 | Guffeth | Jan. 24, 1905 |
| 1,350,058 | Benedict | Aug. 17, 1920 |
| 1,896,249 | Russell | Feb. 7, 1933 |
| 2,251,567 | Gould et al. | Aug. 5, 1941 |